United States Patent [19]
Craven

[11] Patent Number: 5,744,008
[45] Date of Patent: Apr. 28, 1998

[54] HURRICANE TOWER WATER DESALINATION DEVICE

[75] Inventor: John P. Craven, Honolulu, Hi.

[73] Assignee: Oceanit Laboratories, Inc., Honolulu, Hi.

[21] Appl. No.: 581,941

[22] Filed: Jan. 2, 1996

[51] Int. Cl.$^6$ ............................ B01D 3/00; C02F 1/18
[52] U.S. Cl. ............... 202/83; 202/175; 202/185.1; 202/238; 202/267.1; 203/10; 203/86; 203/DIG. 17; 159/6.1; 159/25.2
[58] Field of Search ..................... 202/175, 267.1, 202/189, 185.4, 185.1, 202, 234, 238, 182, 83; 203/86, 10, DIG. 1, DIG. 17, 100, 1; 159/6.1, 904, 25.2, DIG. 15; 210/787

[56] References Cited

U.S. PATENT DOCUMENTS

| | | | |
|---|---|---|---|
| 3,300,868 | 1/1967 | Anderwert | 159/6.1 |
| 3,334,026 | 8/1967 | Dobell | 159/904 |
| 3,640,330 | 2/1972 | Javet | 202/238 |
| 3,654,981 | 4/1972 | Aitchison | 159/6.1 |
| 3,725,209 | 4/1973 | Rosa | 202/238 |
| 3,837,491 | 9/1974 | Hermiston et al. | 210/787 |
| 4,297,111 | 10/1981 | Ross | 159/6.1 |
| 4,451,334 | 5/1984 | Ciocca et al. | 202/174 |
| 4,597,835 | 7/1986 | Moss | 202/238 |
| 4,762,592 | 8/1988 | Li | 202/175 |
| 4,863,567 | 9/1989 | Raley | 203/11 |
| 5,030,327 | 7/1991 | Lee | 203/10 |
| 5,078,880 | 1/1992 | Barry | 203/10 |
| 5,534,118 | 7/1996 | Mc Cutchen | 203/DIG. 17 |
| 5,565,065 | 10/1996 | Wang | 203/10 |
| 5,569,357 | 10/1996 | Kuhn | 202/238 |

OTHER PUBLICATIONS

Hogan et al., "Desalination by Solar Heated Membrane Distillation", Desalination, pp. 81–90 (1991).
William O'Keefe, "Consider Zig-Zag Impeller for Desalination Projects", Power, pp. 86, 88 (Oct. 1993).
"Desalination Can Produce New Revenue Stream", Power, pp. 9–10, (Aug. 1993).
Gerofi et al., "A Simple, More Accurate Criterion . . . ", Desalination, pp. 255–270 (1984).
Nils Kjellander, "Design and Field Tests of a Membrane Distillation System . . . ", Desalination, pp. 237–234 (1987).
Roberta Friedman, "Seawater to Drink", Technology Review, pp. 14–15 (Aug./Sep. 1989).
"The Directory of U.S. Government Inventions: Abstracts/Summaries . . . ", #3837, High Performance Solar Still, p. 430 (1992).
J.B. Rossiter, "Producing Freshwater from Seawater on Ships and Platforms", Distillation, pp. 14–16 (Feb. 1982).

(List continued on next page.)

*Primary Examiner*—Virginia Manoharan
*Attorney, Agent, or Firm*—James C. Wray; Meera P. Narasimhan

[57] ABSTRACT

A simple, portable and efficient water desalination device uses deep ocean water, solar energy and the dynamics of generated secondary vortices. The device includes a tower, a heat exchanger positioned inside the tower near the top of the tower, a cold water source, a cold water receiving tank, a condensate catchment grille, a freshwater collecting tank, a rotor extending upward between the side walls of the tower from a lower portion of the tower, a power source for driving the rotor, a warm salt water pan positioned in the bottom of the tower and a warm salt water source. The cold water source is cold deep ocean water that is siphoned to the top of the tower through rollable, transportable fabric pipes. The warm salt water source is solar heated ocean water. In the tower, a hurricane is simulated by a rotating column that induces a circulation of air which approximates that of a hurricane. The rising warm vapor contacts the cold plate of the heat exchanger, condenses into droplets on the plate, and collects in a reservoir. That process is accomplished without consuming ocean water nutrients. Multiple desalination devices are placed on a barge to create a mobile vortex-principal desalination plant for military operations and other temporary or emergency applications.

22 Claims, 2 Drawing Sheets

OTHER PUBLICATIONS

Mark D. Uehling "Salt Water on Tap", Popular Science, pp. 82–85 (Apr. 1991).

Friedlander, "Science and the Salty Sea", Selected Papers on Desalination and Ocean Technology, pp. 63–64 (Aug. 1965) (in IEEE Spectrum).

Simpson et al., "Technology of Seawater Desalination", Selected Papers on Desalination and Ocean Technology, pp. 388–413 (1968).

A. Frankel, "Flash Evaporators for the Distillation of Seawater", Selected Papers on Desalination & Ocean Technology, pp. 188–202 (1960), (in Proc. Instn. Mech. Engrs).

Scenna et al., "A Thermodynamic Methodology for Process Synthesis . . . ", Trans Icheme, pp. 77–84 (Jan. 1993).

D. James Baker, "Demonstrations of Fluid Flow . . . ", pp. 647–652 (Feb. 1966).

Foster et al., "Operating Experience . . . ", Sleected Papers on Desalination . . . , pp. 303–327 (Oct. 3–9, 1965).

U. Merten, "Reverse Osmosis", Selected Papers on Desalination and Ocean Technology, pp. 391–411 (Oct. 3–9, 1965).

"Desalted Water: Drink of the Future", The Science Teacher, p. 12 (May 1992).

Richard W. Stevenson, "Dry California Turns to the Pacific", The New York Times, pp. D1, D7 (Mar. 6, 1991).

"Drinking Buddies", Entrepreneur, p. 158, Issue 13, vol. 22.

Papafotiou et al., "Synthesis of Reverse–Osmosis Desalination Plant", Trans Icheme, pp. 304–312 (May 1992).

Michael Wehner, "A Research and Demonstration Project . . . ", Desalination, pp. 37–52 (Aug. 23–27, 1992).

D. James Baker, "Demonstrations of Fluid Flow . . . ", American Journal of Physics, pp. 980–986 (Nov. 1968).

Hof et al., "Drought is the Mother of Invention", Business Week, pp. 70–72 (Oct. 14, 1991).

John Prendergast, "The Desalination Situation", Civil Engineering, pp. 42–44 (Aug. 1992).

Philip H. Abelson, "Desalination of Brackish and Marine Waters", Science, p. 1289 (Mar. 15, 1991).

Janet Raloff, "Desalination, the Microbial Way", Science News, p. 367 (Nov. 30, 1991).

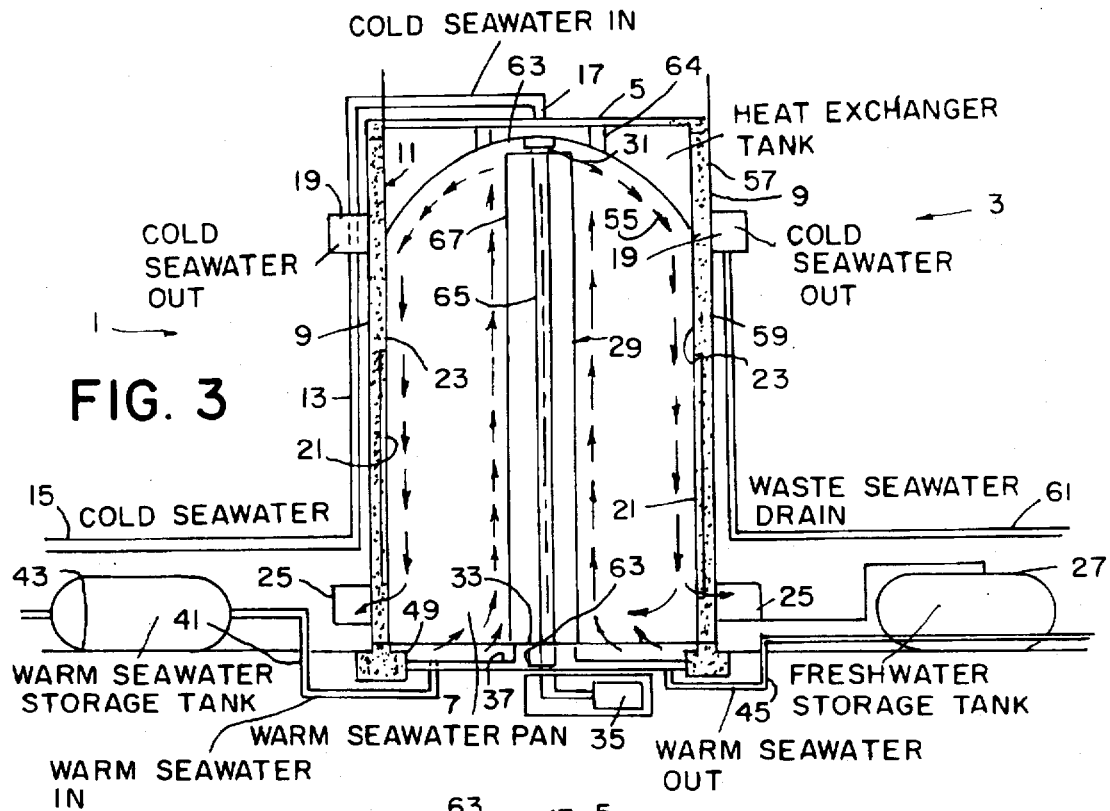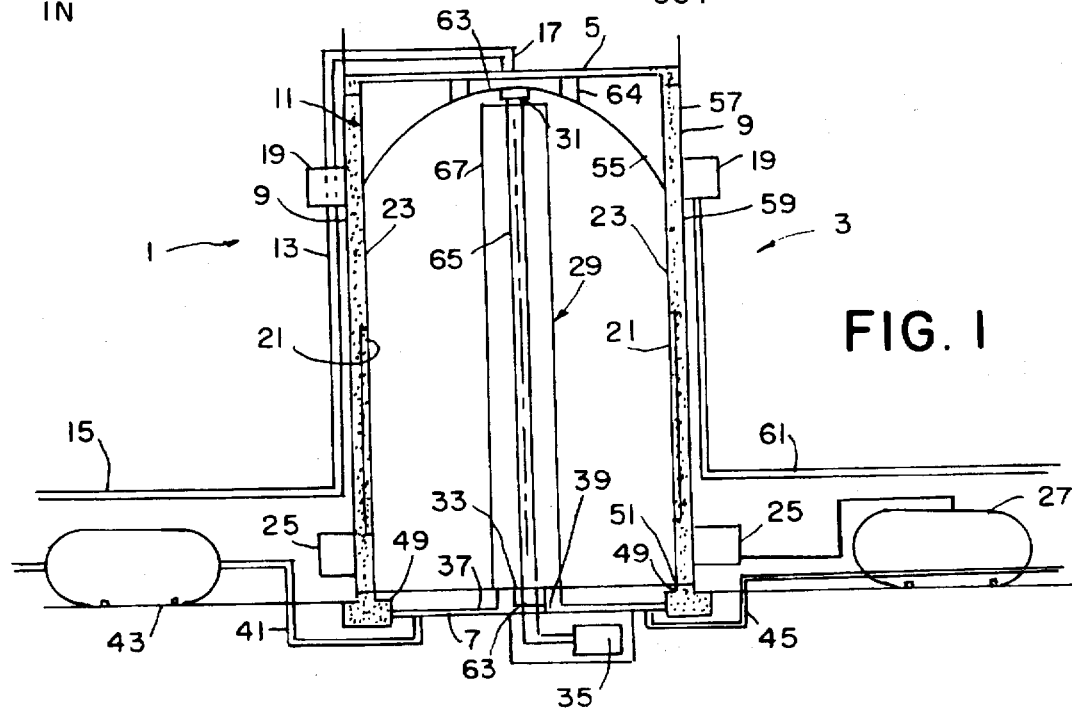

HURRICANE TOWER WATER DESALINATION DEVICE

BACKGROUND OF THE INVENTION

This invention relates to the production of fresh water by the desalination of salt water.

Fresh water is an essential life-sustaining consumable. In scenarios of prolonged military conflict, natural disaster, water shortage or drought, floating platforms equipped with efficient desalination devices using in-situ resources are the ideal solution to water supply problems. However, given the high expenses affiliated with existing desalination plants, cost is a major concern when considering the design and development of a new desalination system or concept.

Military operations have created needs for offshore, mobile platform assemblies for carrying logistics and supplies for soldiers engaged in nearby conflicts. Supplies including food and water are essential and, if a conflict is prolonged, such supplies need to be resupplied on a periodic basis. Needs exist for self-replenishing platforms that are man-tended for gathering consumables and for performing routine maintenance.

Existing desalination plants for converting sea water into fresh water have proven ineffective and expensive. In an existing high performance solar still, cold sea water is fed by means of a pipe perforated along its horizontal length. The sea water flows down an inclined plane and through a black wick material placed on top of a double or parallel plate base. The base functions as a heat exchanger that transfers heat from a working fluid to the sea water. The sea water in turn evaporates while flowing down the wick. The vapor condenses as pure water on the upper cover of the still. The vapor condensate is collected as it flows down the inclined upper inner surface and is drawn off. The working fluid is recirculated to continuously heat and then cool the distillate. Desalination devices using that technology are extremely expensive and cannot meet the needs of military readiness and rapid deployment, assembly and disassembly. Needs exist for simple, economical and effective desalination devices that use inexpensive natural resources and that are easily assembled, disassembled and transported.

SUMMARY OF THE INVENTION

The present invention provides a simple, portable and efficient water desalination device which uses the abundant and inexpensive natural resources found in the very environment where the device is located. The desalination device takes advantage of abundant deep ocean water and solar energy and incorporates the dynamics of generated secondary vortices of the type commonly encountered when stirring a cup of tea or, on a larger scale, within a hurricane. Several of the devices, when positioned on a barge, create an inexpensive mobile vortex-principled water desalination plant for military troops, island states such as Hawaii, territories, atolls, third world nations and coastal drought areas to increase fresh water supplies routinely and to provide on demand fresh water supplies during dry periods and emergencies.

The secondary vortex concept of fluid flow in a rotating system, which is inherent in a hurricane system, is extremely effective when applied to the water desalination problem. A hurricane is an example in nature where that concept produces fresh water from ocean water. At great velocities, secondary vortices carry warm vapor from the ocean surface to higher altitudes in lenticular clouds where condensation occurs. In that way, rain is produced from the warm moist air. In nature, the hurricane is actually a solar still whose efficiency is greatly enhanced by the action of secondary vortices. The present device is a smaller version of a contained hurricane whose efficiency is further increased by rotor-generated vortices. Before discussing additional details of the new device, the concept can be easily explained by a "stirring tea cup" example which visually generates a secondary vortex.

When a cup of tea is stirred, tea leaves collect in the center of the cup. When the tea is rotating around the center of the cup, the centripetal acceleration for such circular motion comes from the pressure difference between the tea nearer the wall and the tea nearer the central axis. That pressure difference leads to an additional flow, called the secondary flow, that deposits the tea leaves in the center of the cup. Consider two horizontal surfaces through the tea—the top layer and the bottom layer. In both layers there is greater pressure at larger radii from the center. In the bottom layer, however, less pressure difference is needed to provide the centripetal acceleration because the friction from the cup's bottom prevents the tea from circling as fast as it does higher up. In both top and bottom layers there is a pressure difference, but the difference is greater at the top. If a small parcel of tea is initially at the outer top part of the top surface, not only does the parcel circle the central axis, but the parcel also descends along the wall to the bottom. To replace fluid lost from the outer top, there is a flow of fluid from the central bottom upward along the central axis and then to the outer top. Thus, while the tea is circling, it is also flowing from outer top to outer bottom, to inner bottom, to inner top, and finally to outer top again. Tea leaves on the bottom are captured by this secondary flow and deposited in the center of the cup where the fluid begins its ascent. In sum, as described, the stirring motion creates a secondary vortex. That secondary vortex, which moves the fluid up and then down again, is the key motion utilized. In the hurricane tower concept of the present invention, the fluid of interest is water vapor.

When viewing the present desalination device as a contained hurricane, it is also important to consider aspects of hurricane formation. Hurricanes begin as relatively small tropical cyclones which drift gradually to the west-northwest in the Northern Hemisphere, while imbedded in the westward-blowing trade winds of the tropics. Under certain conditions, those disturbances increase in size, speed and intensity until they become full-fledged hurricanes. The hurricane is an ideal vortex which results from the concentration of randomly generated vorticity in tropical waters. The central core of the hurricane induces vortex cells characterized by updrafts which carry moisture-laden vapor from the surface to the lenticular cloud. Moisture then precipitates in the down draft of the vortex. Each vortex cell induces another vortex cell of larger diameter and smaller strength until the cells decay at the periphery of the hurricane. Hurricanes are driven by the heat released by condensing water vapor and by external mechanical forces. Once cut off from the warm ocean, the storm begins to die, starved for water and heat energy and dragged apart by friction as the storm moves over the land.

In the present invention the hurricane tower replaces the lenticular cloud with a cold plate heat exchanger which is kept cold by the flow of cold deep ocean water at four to six degrees centigrade. The cold ocean water is delivered by pipe lines from a depth of 2,000 feet, and siphoned from sea level to a maximum tower height of up to thirty feet, the height to which water can be lifted by the siphon without paying a penalty for pressure. Rollable fabric pipes are used for temporary or emergency installations. Siphoning is assisted by a small pump to overcome frictional loss. The ocean is simulated by a pool of solar heated oceanic water which flows into the base of the tower through a tray and is replenished as needed to an established level. The core of the hurricane is simulated by a smooth rotating column driven by external electrical energy and whose rotation and diameter induces a circulation of air which approximates the core of the hurricane. The rapidly rising warm vapor hit s a dome-shaped cold plate, condenses into droplets onto the plate, and collects in a reservoir. The structure of the tower is made of reinforced concrete with bearings at the top and bottom for the rotor, with a strong frame where the bearings fit.

Numerous factors set practical limits on the dimensions of the tower. The rotational velocities induced by the rotor must be subsonic and heuristically of the order of magnitude of the velocities in a hurricane, 75–150 miles per hour. The energy required to rotate the tower will vary with the cube of the velocity. Therefore, roughly eight times as much power will be required for the larger value as compared with the smaller. The vertical flows will vary by a factor of two. Other factors besides vertical velocity determine the quantities of fresh water generated. The amount produced varies with the size of the tower, the rotational velocity of the rotating column, the strength of the induced vortex, the temperature of the warm ocean water, the temperature of the cold plate, the rate at which water vapor is transferred from the water surface to the induced vortex, the surface area of induced vertical flow and the velocity of the induced vertical flow.

The vertical height of the tower must be high enough to permit the fully developed aero/hydrodynamic field to form. This moves in the direction of increased height. At the same time the higher the tower the greater the energy losses in the vortex and a consequent reduction in vertical velocity. As mentioned previously, a siphon bringing cold deep ocean water to the top of the tower is limited to a height of thirty feet. The diameter of the tower is dictated by the need to preserve a single induced vortex as against a series of cells. Against that limitation is the need for surface area contact between the secondary vortex and the hot water. Since the internal flows in the tower are as strong as those experienced in a hurricane, the tower needs to resist internal pressures as high as fifty pounds per square foot ($V^2/2$ g). Thus, for a tower thirty feet high having a diameter of twenty feet, vertical flows of the order of magnitude of 2,000 cubic feet per second are expected. For an atmosphere saturated with surface water vapor at a temperature of 25° C., 0.73 liters of water are extracted per second. By heating the water to a temperature of 71° C., the amount of water extracted increases to 11.33 liters per second.

The present invention differs significantly from existing distillation towers and concepts in that the present tower incorporates a vortex generator.

The present invention is portable and uses available deep ocean water, solar energy and the dynamics of generated vortices. The present invention is an enhanced solar still whose efficiency is increased by high-speed vapor transport via rotor-generated secondary vortex action. Operating costs are minimal, as the coolant for vapor condensation, deep ocean water, and the means for heating the water, solar heating, are essentially cost free.

The present invention has potential uses in military and civilian applications. Desalination plants incorporating the hurricane tower are easily deployed on floating platforms for military operations. Island nations, third world countries, and disaster and coastal drought areas can rely on the present invention for emergency water supply and supplemental water production.

These and further and other objects and features of the invention are apparent in the disclosure, which includes the above and ongoing written specification, with the claims and the drawings.

BRIEF DESCRIPTION OF THE DRAWINGS

FIG. 1 is a schematic sectional elevation of the present invention.

FIG. 3 shows the path of the water in the desalination process of the present invention.

DETAILED DESCRIPTION OF THE PREFERRED EMBODIMENTS

Figure 2:
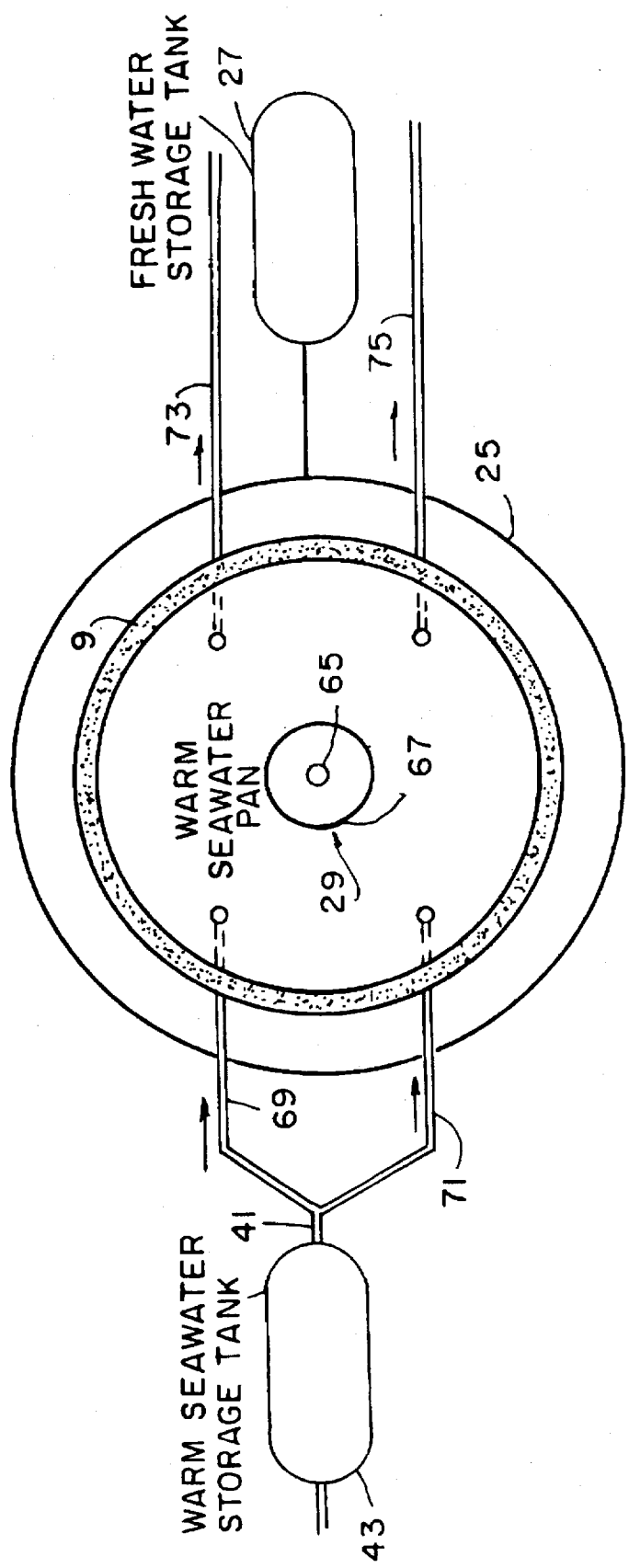
FIG. 2 is a schematic sectional plan view of the present invention.

Referring to FIGS. 1 and 2, the desalination device 1 includes a tower 3 having a top 5, a bottom 7, and side walls 9 extending between the top 5 and the bottom 7. A heat exchanger 11 is positioned inside the tower 3 near the top 5 of the tower 3. Piping 13 extends between a source of cold water and the heat exchanger 11. The piping 13 has a first end 15 connected to the cold water source and a second end 17 connected to an upper portion of the tower 3 for delivering cold water to the heat exchanger 11. At least one cold water catchment tank 19 is connected to the tower 3 near the upper portion of the tower 3 for draining cold water from the heat exchanger 11. A condensation catchment grille 21 extends around inner surfaces 23 of the side walls 9 of the tower 3. The catchment grille 21 collects the condensed vapor dropping from the heat exchanger 11. At least one annular fresh water collecting tank 25 is connected to the condensation catchment grille 21 for collecting the fresh water. A storage tank 27 is connected to the collecting tank 25 for storing the retrieved desalinated fresh water. A rotor 29 extends upward between the side walls 9 of the tower 3 from a lower portion of the tower. Preferably, the rotor 29 has a top end 31 near the heat exchanger 11 and a bottom end 33 connected to a motor 35 for driving the rotor 29. A pan 37 is positioned in the bottom 7 of the tower 3 for holding warm salt water. The pan 37 has an opening 39 for receiving the bottom end 33 of the rotor 29. A first tubing 41 extends between a warm salt water storage tank 43 and the pan 37 for delivering warm salt water to the pan 37. A second tubing 45 extends from the warm salt water pan 37 for draining warm salt water from the pan 37.

In preferred embodiments, the tower 3 has a cylindrical shape. The top 5 extends between upper edges of the cylindrical side walls 9. In one embodiment, the bottom 7 is disc shaped and extends between lower edges of the cylindrical side walls 9. In another embodiment, the bottom 7 is ring shaped and is connected to lower edges of side walls 9. In that embodiment, the inner edges 49 of the bottom define an area for receiving outer edges 51 of the warm salt water pan 37.

In preferred embodiments, the top 5, the bottom 7 and the side walls 9 of the tower 3 are made of reinforced concrete. The side walls 9 are about six inches thick and the diameter of the tower is about 20 feet. Preferably, the height of the tower 3 does not exceed 30 feet, the height to which water can be lifted by a siphon without paying the penalty for added pressure.

A cold water source provides water to the heat exchanger 11. In preferred embodiments, the cold water is supplied from the depths of the ocean. Deep cold water at about four to six degrees centigrade is transported by pipes from depths of about 2,000 feet and is siphoned from sea level to the top of the tower. A small pump is used to overcome friction loss during the siphoning process. In preferred embodiments of the present invention, rollable deep ocean pipes are used to transport the cold water from the bottom of the ocean to the tower. That allows assembly and disassembly of temporary or emergency installations.

As shown in FIGS. 1 and 2, the heat exchanger 11 preferably includes a dome-shaped cold plate 55 on the bottom of a heat exchanger tank 57. The cold plate 55 extends from inner surfaces 23 of the side walls 9 of the tower 3. The tank 57 has dimensions defined by the cold plate 55, the top 5 of the tower 3 and the side walls 9 of the tower 3. In preferred embodiments, the cold plate 55 is dome-shaped and extends from inner surfaces 23 of the side walls 9 near the upper portion of the tower 3. Cold water is siphoned to the top of the tower 3 and either fills the tank 57 or cascades over the dome-shaped cold plate 55. A cold water receiving tank 19 extends around the outer surfaces 59 of the side walls 9 of the tower 3 near the top 5 of the tower 5. Drain 61 extends from the tank 19 for draining the water from the tank 19. When the tanks 57 and 19 are sealed and full, water falling in drain 61 draws water upward in supply line 13.

As shown in FIG. 1, the condensate catchment grille 21 extends along a portion of inner surfaces 23 of the side walls 9 between the heat exchanger 11 and the pan 37. A fresh water storage tank 27 is connected to the fresh water catchment tank 25 for storing the desalinated water. Preferably, the fresh water catchment tank 27 wraps around the outer side walls 59 of the tower 3.

The rotor 29 is preferably positioned in the center of the tower 3. The rotation and diameter of the rotor 29 induces a circulation of air which approximates the core of a hurricane. The rotational velocities induced by the rotor 29 are subsonic and heuristically of the order of magnitude of the velocities in a hurricane. Preferably, the rotor 29 rotates with a surface velocity in the range of 75 to 100 miles per hour and is driven by external electrical energy operating the rotor motor 35.

FIGS. 1 and 2 show a preferred embodiment of the rotor 29 having a cylindrical tubular shape. The lower end 33 of the rotor 29 extends through a circular opening 39 in the warm salt water pan 37. The upper end 31 of the rotor 29 is mounted below the heat exchanger 11. In preferred embodiments, ball bearings 63 are positioned where the rotor 29 is connected to the tower 3. A strong frame 64 is constructed near where the bearings 63 are fit in the dome-shaped ceiling 55. The rotor 29 includes a central rotating shaft 65 extending between the bearings 63 at the heat exchanger 11 and the power source 35. Cylindrical rotor 67 surrounds the shaft 65 and rotates along with the shaft 65.

In preferred embodiments, warm sea water from a warm salt water source is stored in seawater storage tank 43. The tubing 41 may have multiple branches 69, 71 for bubbling warm salt water upward from multiple locations in the pan 37. Multiple tubes 73, 75 are used for draining the warm salt water pan 37 from multiple locations.

Mobile, temporary embodiments of the present invention are easily assembled. The tower, including the rotor, the warm water pan, the heat exchanger and the catchment grille are positioned on a floating platform. Deep ocean fabric pipes are rolled off the platform and extend between the tower and the depths of the ocean for delivering cold water to the heat exchanger.

FIG. 3 shows the path of the water vapor during the desalination process. Initially, cold water is siphoned to the cold plate heat exchanger and warm salt water is delivered to the warm salt water pan. The rotor, driven by electrical energy, begins to rotate with a surface velocity in the range of about 75 to 150 miles per hour. As the air circulates, stirred by the whirling rotor, water vapor rises from the surface of the water in the warm water pan. The water vapor swirls upward along the rotor until the water vapor contacts the cold plate of the heat exchanger. The water vapor then condenses into fresh water droplets which begin flowing downward along the chilled dome and along the inner surfaces 23. The catchment grille 21 catches most of the fresh water and delivers the captured fresh water to a storage tank. The vapor continues to flow in a vortex and more water vapor evaporates, and the new vapor joins the swirling vortex. The process continues indefinitely. The warm water pan continuously is replenished with warm seawater. The increased salt content seawater is continuously drained from the pan. The heat exchanger tank continuously is supplied with cold water. The amount of fresh water produced depends on multiple factors, including the size of the tower, the rotational velocity of the rotor, the strength of the induced vapor vortex, the temperature of the warm salt water, the temperature of the cold plate, the rate at which water vapor is transported from the water surface to the induced vortex, the surface area of the induced vertical flow and the velocity of the induced vertical flow.

While the invention has been described with reference to specific embodiments, modifications and variations of the invention may be constructed without departing from the scope of the invention, which is defined in the following claims.

I claim:

1. A desalination apparatus comprising a tower having a top, a bottom, and side walls extending between the top and the bottom, a warm salt water pan positioned in the bottom of the tower, the pan having an opening for receiving a bottom end of a rotor, a warm salt water source, first tubing connected to the warm salt water source and to the warm salt water pan for delivering warm salt water to the pan, second tubing connected to the warm salt water pan for draining warm salt water from the pan, the rotor extending upward between the side walls of the tower from a lower portion of the tower for stirring air and water vapor in the tower and forming a vortex, a heat exchanger positioned inside the tower near the top of the tower for condensing vapors swirling upward in the vortex into fresh water condensate at the top of the tower and promoting the vortex, the rotor having a top end connected to the heat exchanger and a bottom end connected to a rotary power source, a cold water source, piping having a first end connected to the cold water source and a second end connected to an upper portion of the tower and to the heat exchanger for delivering cold water to the heat exchanger, at least one cold water receiving tank connected to the tower near the upper portion of the tower for draining cold water from the heat exchanger, a condensate catchment device connected to and extending around inner surfaces of the side walls of the tower, and at least one fresh water collecting tank connected to the condensate catchment device for collecting fresh water from the condensate catchment device.

2. The apparatus of claim 1, wherein the tower has cylindrical side walls, the top extends between upper edges of the side walls, and the bottom is connected to lower edges of side wall, and wherein the heat exchanger comprises a cold water tank having a dome-shaped cold plate as a base of the cold water tank for condensing the vapors on the dome-shaped cold plate and for flowing resulting condensate outward and downward along the dome-shaped cold plate and downward along inner surfaces of the side walls to the condensate catchment device.

3. The apparatus of claim 1, wherein the top, bottom and side walls are made of reinforced concrete, and wherein the condensate catchment device is a catchment grille.

4. The apparatus of claim 1, wherein the tower has a cylindrical shape, wherein the side walls are about thirty feet tall, and wherein the tower is about twenty feet in diameter.

5. The apparatus of claim 1, wherein the cold water source is a source of deep ocean water.

6. The apparatus of claim 5, wherein cold water source is the ocean, and the cold water is cold seawater.

7. The apparatus of claim 1, wherein the heat exchanger further comprises a cold plate on a bottom of a heat exchanger tank.

8. The apparatus of claim 7, wherein the cold plate extends from inner surfaces of the side walls of the tower, and wherein the tank has dimensions defined by the cold plate, the top of the tower and the side walls of the tower.

9. The apparatus of claim 7, wherein the cold plate is dome-shaped and extends upward and inward from inner surfaces of the side walls near the upper portion of the tower.

10. The apparatus of claim 7, wherein the second end of the piping is connected to the top of the tower and delivers cold water to the heat exchanger tank.

11. The apparatus of claim 1, further comprising a drain extending from the cold water receiving tank for draining the water from the heat exchanger away from the receiving tank and the tower.

12. The apparatus of claim 1, wherein the condensate catchment device is a grille extending along the inner surfaces of the walls of the tower between the heat exchanger and the pan.

13. The apparatus of claim 1, further comprising a fresh water storage tank connected to the at least one fresh water collecting tank for storing fresh water.

14. The apparatus of claim 1, wherein the at least one fresh water collecting tank and the at least one cold water receiving tank are annular and wrap around the side walls of the tower and are connected to outer surfaces of the side walls.

15. The apparatus of claim 1, wherein the rotary power source is a motor.

16. The apparatus of claim 1, wherein the rotor is tubular and extends through a center of the tower, and wherein the opening in the warm salt water pan is circular.

17. The apparatus of claim 16, wherein the rotor further comprises a central rotating shaft extending between the heat exchanger and the rotary power source, and a cylindrical rotor body surrounding and connected to the central shaft for rotating with the shaft.

18. The apparatus of claim 1, wherein the warm salt water source is a warm seawater storage tank, and wherein the warm salt water is warm seawater.

19. The apparatus of claim 1, wherein the first tubing has multiple branches for bubbling salt water to multiple locations in the warm salt water pan.

20. The apparatus of claim 1, wherein the second tubing includes multiple tubes for draining the warm salt water pan from multiple locations.

21. The apparatus of claim 1, wherein the piping for delivering the cold water from the cold water source to the heat exchanger is rollable fabric piping.

22. A desalination plant apparatus comprising a mobile support structure and at least one desalination station, the at least one desalination station further comprising a tower having a top, a bottom, and side walls extending between the top and the bottom, a heat exchanger positioned inside the tower near the top of the tower, a cold water source, piping having a first end connected to the cold water source and a second end connected to an upper portion of the tower and the heat exchanger for delivering cold water to the heat exchanger, at least one cold water receiving tank connected to the tower near the upper portion of the tower for draining cold water from the heat exchanger, a condensate catchment grille connected to and extending around inner surfaces of the side walls of the tower, at least one fresh water collecting tank connected to the condensate catchment grille for collecting fresh water, a rotor extending upward between the side walls of the tower from a lower portion of the tower, the rotor having a top end connected to the heat exchanger and a bottom end connected to a rotary power source, a warm salt water pan positioned in the bottom of the tower, the pan having an opening for receiving the bottom end of the rotor, a warm salt water source, first tubing connected to the warm salt water source and to the warm salt water pan for delivering warm salt water to the pan, and second tubing connected to the warm salt water pan for draining warm salt water from the pan.

\* \* \* \* \*

UNITED STATES PATENT AND TRADEMARK OFFICE
CERTIFICATE OF CORRECTION

PATENT NO. : 5,744,008
DATED : April 28, 1998
INVENTOR(S) : John P. Craven It is certified that error appears in the above-identified patent and that said Letters Patent is hereby corrected as shown below:

On the title page, under item [73], after "Oceanit Laboratories, Inc., Honolulu, Hi" insert --and Common Heritage Corporation, Honolulu, Hi--.

Signed and Sealed this

Fifteenth Day of June, 1999

Attest:

Q. TODD DICKINSON

*Attesting Officer*                *Acting Commissioner of Patents and Trademarks*